United States Patent
Ehlers et al.

(10) Patent No.: US 6,932,716 B2
(45) Date of Patent: Aug. 23, 2005

(54) GOLF CLUB HEAD

(75) Inventors: Steven M. Ehlers, Poway, CA (US); John B. Kosmatka, Encinitas, CA (US); Anthony V. Nigro, Oceanside, CA (US); Matthew J. Erickson, San Diego, CA (US)

(73) Assignee: Callaway Golf Company, Carlsbad, CA (US)

( * ) Notice: Subject to any disclaimer, the term of this patent is extended or adjusted under 35 U.S.C. 154(b) by 124 days.

(21) Appl. No.: 10/249,715

(22) Filed: May 2, 2003

(65) Prior Publication Data

US 2003/0228932 A1 Dec. 11, 2003

(51) Int. Cl.[7] .................................................. A63B 53/04
(52) U.S. Cl. ........................ 473/329; 473/349; 473/342; 473/345; 473/340; 473/350
(58) Field of Search .................................. 473/324–350, 473/290–291

(56) References Cited

U.S. PATENT DOCUMENTS

| | | | |
|---|---|---|---|
| 3,847,399 A | * 11/1974 | Raymont | .................... 473/350 |
| 3,937,474 A | 2/1976 | Jepson et al. | |
| 3,975,023 A | 8/1976 | Inamori | |
| 3,989,248 A | 11/1976 | Campau | |
| 4,252,262 A | 2/1981 | Igarashi | |
| 4,326,716 A | 4/1982 | LaCoste | |
| 4,398,965 A | 8/1983 | Campau | |
| 4,498,672 A | 2/1985 | Bulla | |
| 4,679,792 A | * 7/1987 | Straza et al. | ................. 473/329 |
| 4,681,322 A | * 7/1987 | Straza et al. | ................. 473/329 |
| 4,687,205 A | 8/1987 | Tominaga et al. | |
| 4,809,978 A | 3/1989 | Yamaguchi et al. | |
| 4,824,110 A | 4/1989 | Kobayashi | |
| 4,930,781 A | * 6/1990 | Allen | .......................... 473/346 |
| 5,060,951 A | * 10/1991 | Allen | .......................... 473/346 |
| 5,083,778 A | 1/1992 | Douglass | |
| 5,172,913 A | 12/1992 | Bouquet | |
| 5,261,663 A | 11/1993 | Anderson | |
| 5,261,664 A | 11/1993 | Anderson | |
| 5,272,802 A | 12/1993 | Stites, III | |
| 5,282,624 A | 2/1994 | Viste | |
| 5,299,807 A | 4/1994 | Hutin | |
| 5,301,941 A | * 4/1994 | Allen | .......................... 473/327 |
| 5,310,185 A | 5/1994 | Viollaz et al. | |
| 5,344,140 A | 9/1994 | Anderson et al. | |
| 5,346,217 A | * 9/1994 | Tsuchiya et al. | ............. 473/345 |
| 5,401,021 A | * 3/1995 | Allen | .......................... 473/291 |
| 5,417,419 A | 5/1995 | Anderson et al. | |
| 5,429,357 A | 7/1995 | Kobayashi | |
| 5,431,396 A | 7/1995 | Shieh | |
| 5,458,332 A | 10/1995 | Fisher | |
| 5,458,334 A | 10/1995 | Sheldon et al. | |
| 5,460,371 A | 10/1995 | Takeda | |
| 5,464,216 A | 11/1995 | Hoshi et al. | |
| 5,485,998 A | 1/1996 | Kobayashi | |
| 5,494,281 A | 2/1996 | Chen | |
| 5,497,993 A | * 3/1996 | Shan | .......................... 473/329 |
| 5,501,459 A | 3/1996 | Endo | |
| 5,505,453 A | 4/1996 | Mack | |
| 5,524,331 A | 6/1996 | Pond | |
| 5,527,034 A | 6/1996 | Ashcraft et al. | |
| 5,556,097 A | 9/1996 | Endo et al. | |
| 5,593,356 A | * 1/1997 | Takeda | ........................ 473/335 |
| 5,628,697 A | 5/1997 | Gamble | |
| 5,674,132 A | 10/1997 | Fisher | |
| 5,703,294 A | 12/1997 | McConnell et al. | |

(Continued)

Primary Examiner—Sebastiano Passaniti
(74) Attorney, Agent, or Firm—Michael A. Catania; Elaine H. Lo

(57) ABSTRACT

A golf club head having a matrix layer composed of an interconnected reinforcement structure and a polymer material is disclosed herein. The matrix layer provides the golf club head with a greater coefficient of restitution during impact with a golf ball. The matrix layer is preferably disposed within a recess in the front wall of the body of the golf club head. The interconnected reinforcement structure is preferably composed of interconnected hexagonal cells.

13 Claims, 10 Drawing Sheets

U.S. PATENT DOCUMENTS

| | | | |
|---|---|---|---|
| 5,743,813 A | 4/1998 | Chen et al. | |
| 5,776,011 A | 7/1998 | Su et al. | |
| 5,788,584 A | 8/1998 | Parente et al. | |
| 5,797,807 A | 8/1998 | Moore et al. | |
| 5,807,190 A * | 9/1998 | Krumme et al. | 473/342 |
| 5,839,975 A * | 11/1998 | Lundberg | 473/346 |
| 5,863,261 A | 1/1999 | Eggiman | |
| 5,873,791 A | 2/1999 | Allen | |
| 5,888,148 A | 3/1999 | Allen | |
| 5,890,973 A | 4/1999 | Gamble | |
| 5,935,020 A | 8/1999 | Stites et al. | |
| 6,093,116 A * | 7/2000 | Hettinger et al. | 473/332 |
| 6,117,024 A | 9/2000 | Dewanjee | |
| 6,227,986 B1 | 5/2001 | Fisher | |
| 6,238,302 B1 | 5/2001 | Helmstetter et al. | |
| 6,273,831 B1 | 8/2001 | Dewanjee | |
| 6,273,832 B1 | 8/2001 | Helmstetter et al. | |
| 6,277,033 B1 * | 8/2001 | Krumme et al. | 473/342 |
| 6,334,817 B1 * | 1/2002 | Ezawa et al. | 473/324 |
| 6,390,932 B1 * | 5/2002 | Kosmatka et al. | 473/324 |
| 6,431,997 B1 | 8/2002 | Rohrer | |
| 6,607,451 B2 * | 8/2003 | Kosmatka et al. | 473/329 |
| 6,699,140 B1 * | 3/2004 | Sun | 473/252 |
| 6,723,007 B1 * | 4/2004 | Chao | 473/342 |

* cited by examiner

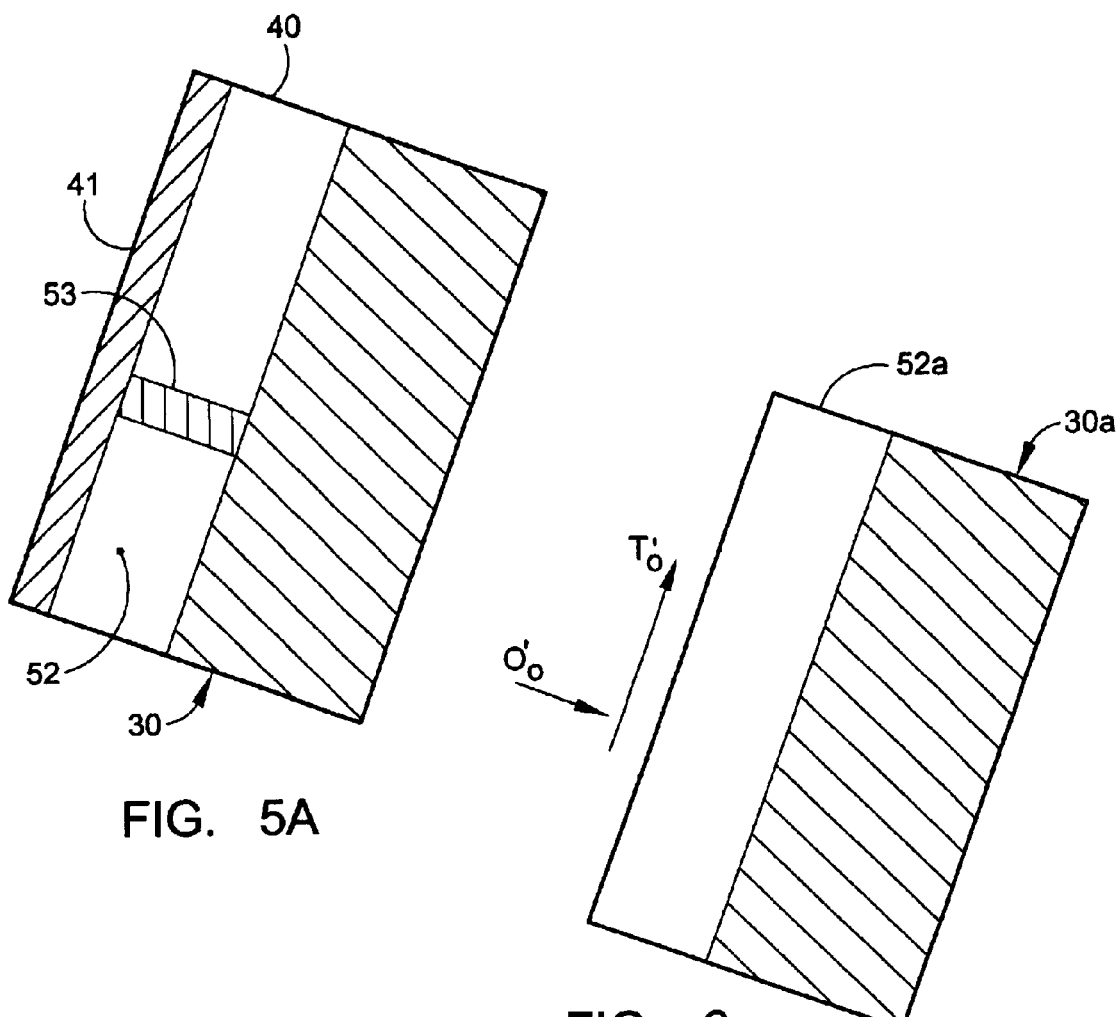
FIG. 5A
FIG. 6
(PRIOR ART)
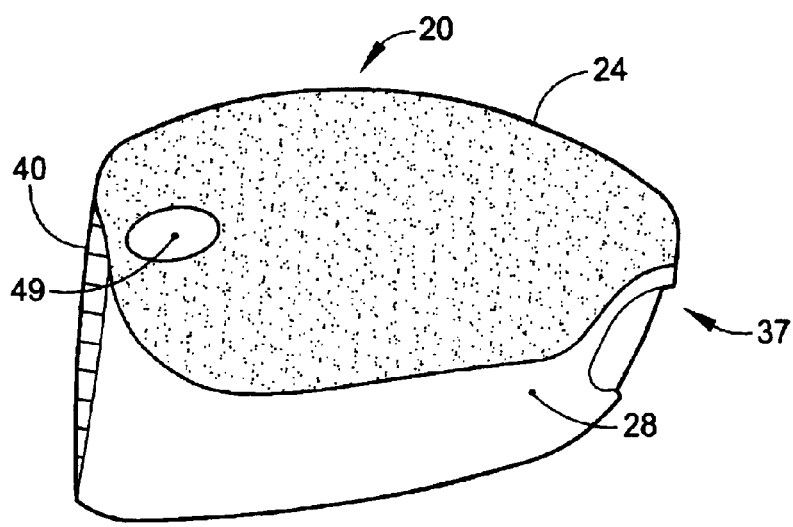
FIG. 7

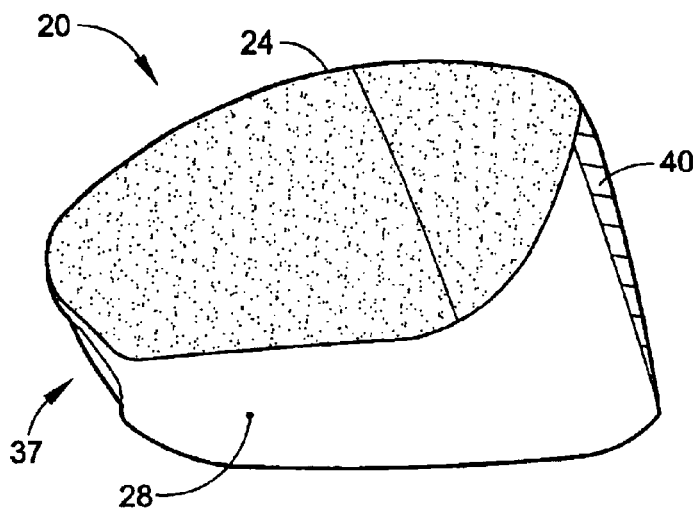
FIG. 8
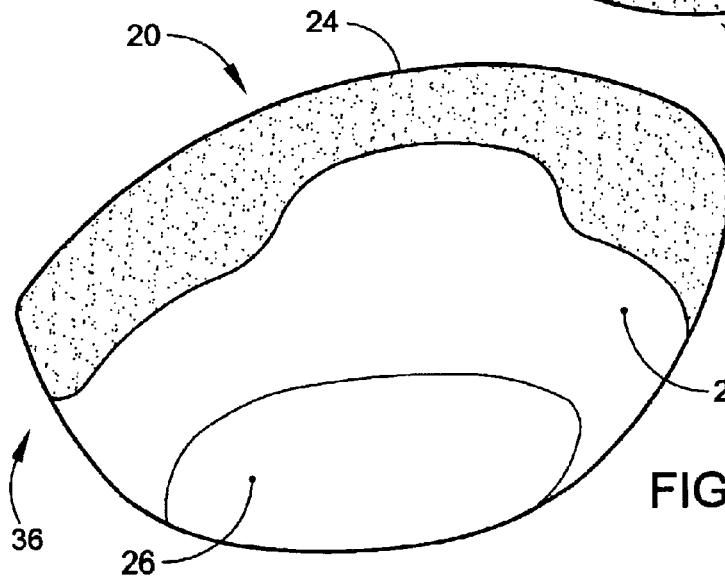
FIG. 9
FIG. 10

GOLF CLUB HEAD

FEDERAL RESEARCH STATEMENT

[Not Applicable]

BACKGROUND OF INVENTION

1. Field of the Invention

The present invention relates to a golf club head. More specifically, the present invention relates to a golf club head with a polymer face.

2. Description of the Related Art

Technical innovation in the material, construction and performance of golf clubs has resulted in a variety of new products. The advent of metals as a structural material has largely replaced natural wood for wood-type golf club heads, and is but one example of this technical innovation resulting in a major change in the golf industry. In conjunction with such major changes are smaller scale refinements to likewise achieve dramatic results in golf club performance. For example, the metals comprising the structural elements of a golf club head have distinct requirements according to location in the golf club head. A sole or bottom section of the golf club head should be capable of withstanding high frictional forces for contacting the ground. A crown or top section should be lightweight to maintain a low center of gravity. A front or face of the golf club head should exhibit high strength and durability to withstand repeated impact with a golf ball. While various metals and composites are known for use in the face, several problems arise from the use of traditional face structure and materials. In addition, material interaction of the golf club head and the golf ball during impact is an important factor for performance of the golf club.

The golf ball is typically composed of a core-shell arrangement with a thin polymer shell, or cover material such as ionomers, surrounding a rubber-like core. These polymeric materials exhibit compression and shear, stiffness and strength properties dependent upon strain (load), input frequency (time dependency of small, linear strain), strain rate (time rate of loading including large nonlinear strains), and temperature. The compression and shear stiffness properties of polymeric materials are measured and classified in terms of a storage moduli (E', G') and a loss moduli (E", G"), respectively. The storage moduli (E', G') represent the amount of compression and shear energy, respectively, stored during a complete loading cycle. For quasi-static loading, it is equivalent to the well known Young's modulus (E'=E) and shear modulus (G'=G=E/(2(1+v)), where (v) is the material Poisson ratio. For most polymers, the storage modulus increases significantly with strain, input frequency, and strain rate. For example, typical storage moduli for golf balls at low speed impacts, in the temperature range (50–100° F.), are $E'_{ball}$=450–6,000 lb/in$^2$ and $G'_{ball}$=150–2,000 lb/in$^2$. During high-speed impacts, in the temperature range (50–100° F.), the typical storage moduli are $E'_{ball}$=9,000–50,000 lb/in$^2$ and $G'_{ball}$=3,000–16,500 lb/in$^2$. The low speed impact represents a putting stroke or a soft pitch shot, while the high-speed impact represents a golf swing with an iron-type or a wood-type golf club head.

The loss moduli (E", G") represent the amount of compression and shear energy, respectively, dissipated during a cycle. For most polymers, the loss moduli also increase significantly with strain, input frequency, and strain rate, but the rate of increase can be very different than the aforementioned storage moduli. Finally, the magnitude of the loss moduli at a given strain, strain rate, frequency, or temperature typically vary from 0.005–2.0 times that of the storage moduli.

A loss (or damping) factor ($\eta_E$, $\eta_G$) or loss angle ($\delta_E$, $\delta_G$) for compression and shear are commonly defined as the ratio of the corresponding moduli;

$$\eta_E = \mathrm{Tan}\delta_E = \frac{E''}{E'}, \eta_G = \mathrm{Tan}\delta_G = \frac{G''}{G'}.$$

These loss factors are an important measure of the damping capability (energy loss mechanisms) of the material. For most ball-type materials, ($\eta_E \cong \eta_G$) and magnitudes fall in the range of 0.005 (low energy loss) to 2.0 (high-energy losses), where magnitudes clearly depend upon polymer composition, strain, input frequency, strain rate, and temperature. As a comparison, the loss factors (energy loss mechanisms) in a metallic face of a golf club head are on the order of 10–100 times smaller than that of a golf ball. For most elastomeric polymer materials operating below the glass transition region, the Poisson ratio is fairly constant with (v=0.4–0.5), while for stiff polymers acting at or above the glass transition region (v=0.3–0.33).

Thus, during impact of the golf ball with the golf club head, a significant portion of impact energy is lost as a result of the large deformations (0.05 to 0.50 inches) and deformation rates of the high damped golf ball materials, as opposed to the small deformations of the low damped metallic club face (0.025 to 0.050 inches) materials. A larger portion of this impact energy is lost in the golf ball because the magnitude of the deformation, the deformation rate, and energy loss mechanisms are greater for the golf ball than the face of the golf club head.

Application of hard polymers to the face of the golf club head represents a traditional structure of natural wood golf club heads, where a hard insert material centrally located in the face of the golf club and requiring an exacting fit between two or more distinct elements. The hard insert must be manufactured to a close tolerance to fit within a recess in the face of the golf club, and high surface hardness is less efficient in transferring energy to the golf ball during impact with the golf club. A homogeneous face structure is simpler to manufacture but is limited to the inherent material properties of the single material comprising the face structure. The present invention achieves a more efficient energy transfer during impact while maintaining a simple construction.

The use of a polymer coating or layer on the face of a metal driver has been shown to increase durability and the coefficient of restitution ("COR") of the driver through the compliance of the polymer layer. However, when a golf ball impacts the face at angles that are not normal to face, such as the case with lofted drivers, shear deformation of the polymer coating introduces energy losses that reduce or eliminate the COR benefit provided by the polymer coating.

SUMMARY OF INVENTION

The present invention provides a solution to the shear deformation of a polymer layer during non-normal angle impact of a golf ball with a polymer coated or polymer layer face. The present invention is a golf club head with a matrix layer disposed on the face. The matrix layer is preferably composed of a reinforcement structure and a polymer material. The reinforcement structure reduces or prevents the shear deformation of the polymer material during impact of a face of a golf club head with a golf ball. The reinforcement structure also reduces or prevents the shear deformation of the polymer material without affecting the normal compliance behavior of the polymer material during impact of a face of a golf club head with a golf ball thereby resulting in a golf club head with a greater COR and better durability.

One aspect of the present invention is a wood-type golf club head with a matrix layer disposed on the front wall of a body of the wood-type golf club head. The matrix layer preferably comprises a reinforcement structure and a polymer material.

Another aspect of the present invention is an iron-type golf club head with a matrix layer disposed on the front wall of a body of the iron-type golf club head. The matrix layer preferably comprises a reinforcement structure and a polymer material.

Yet another aspect of the present invention is a putter-type golf club head with a matrix layer disposed on the front wall of a body of the putter-type golf club head. The matrix layer preferably comprises a reinforcement structure and a polymer material.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF DRAWING

FIG. 5A is an enlarged isolated view of the alternative embodiment of FIG. 4A.

FIG. 6 is an enlarged isolated view of a prior art polymer layer disposed on a front wall of a loft driver to illustrate the shear deformation during impact with a golf ball.

FIG. 7 is a heel-side view of the wood-type golf club head of FIG. 1.

FIG. 8 is a toe-side view of the wood-type golf club head of FIG. 1.

FIG. 9 is a bottom plan view of the wood-type golf club head of FIG. 1.

FIG. 10 is a bottom perspective view of the wood-type golf club head of FIG. 1.

DETAILED DESCRIPTION

As shown in FIGS. 1–10, the golf club head of the present invention is generally designated 20. The golf club head 20 of FIGS. 1–10 is a driver, however, the golf club head of the present invention may alternatively be a fairway wood, an iron or a putter. The golf club head 20 has a body 22 that is preferably composed of a metal material such as titanium, titanium alloy, or the like, and is most preferably composed of a cast titanium alloy material. The body 22 is preferably cast from molten metal in a method such as the well-known lost-wax casting method. The metal for casting is preferably titanium or a titanium alloy such as 6-4 titanium alloy, alpha-beta titanium alloy or beta titanium alloy for forging, and 6-4 titanium for casting. Alternatively, the body 22 is composed of 17-4 steel alloy. Additional methods for manufacturing the body 22 include forming the body 22 from a flat sheet of metal, super-plastic forming the body 22 from a flat sheet of metal, machining the body 22 from a solid block of metal, electrochemical milling the body from a forged pre-form, casting the body using centrifugal casting, casting the body using levitation casting, and like manufacturing methods.

The golf club head 20, when designed as a driver, preferably has a volume from 200 cubic centimeters to 600 cubic centimeters, more preferably from 300 cubic centimeters to 450 cubic centimeters, and most preferably from 350 cubic centimeters to 420 cubic centimeters. A golf club head 20 for a driver with a body 22 composed of a cast titanium alloy most preferably has a volume of 380 cubic centimeters. The volume of the golf club head 20 will also vary between fairway woods (preferably ranging from 3-woods to eleven woods) with smaller volumes than drivers.

The golf club head 20, when designed as a driver, preferably has a mass no more than 215 grams, and most preferably a mass of 180 to 215 grams. When the golf club head 20 is designed as a fairway wood, the golf club head preferably has a mass of 135 grams to 180 grams, and preferably from 140 grams to 165 grams.

Figure 4:
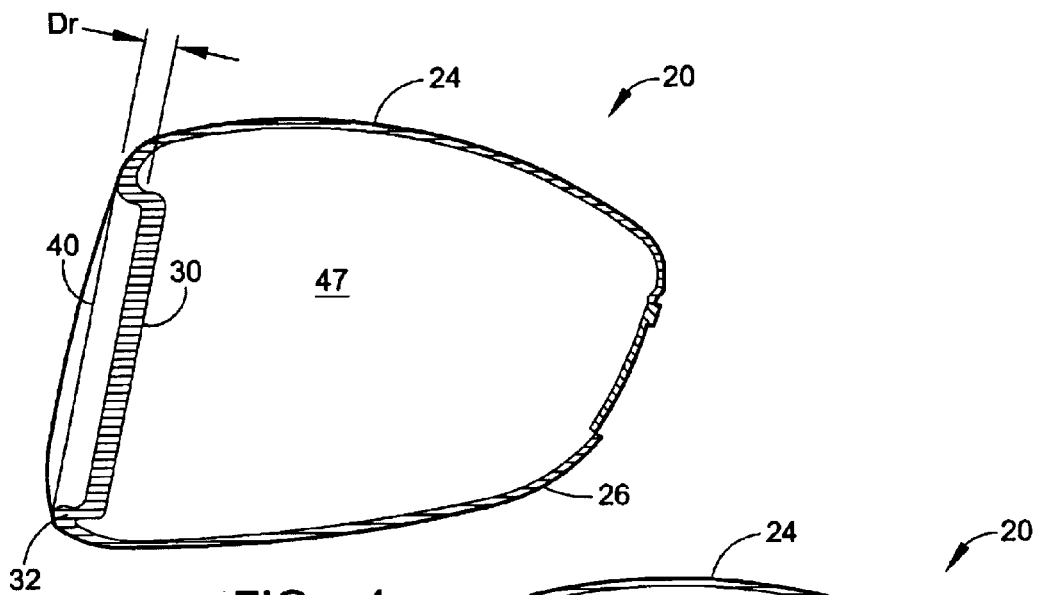
FIG. 4 is a cross-sectional view of the wood-type golf club head of FIG. 1 taken along line 4—4 of FIG. 3.

The body 22 has a crown 24, a sole 26, a ribbon 28, and a front wall 30. The body 22 optionally has a recess 32 in the front wall 30. The recess 32 preferably has a depth, "Dr", as shown in FIG. 4, that ranges from 0.040 inch to 0.250 inch, more preferably from 0.080 inch to 0.120 inch, and is most preferably 0.100 inch. The body 22 preferably has a hollow interior 47. The golf club head 20 has a heel end 36, a toe end 38 an aft end 37. A shaft, not shown, is placed within a hosel 49 at the heel end 36. In a preferred embodiment, the hosel 49 is internal to the body 22, and the shaft extends to the sole 26.

Figure 2:
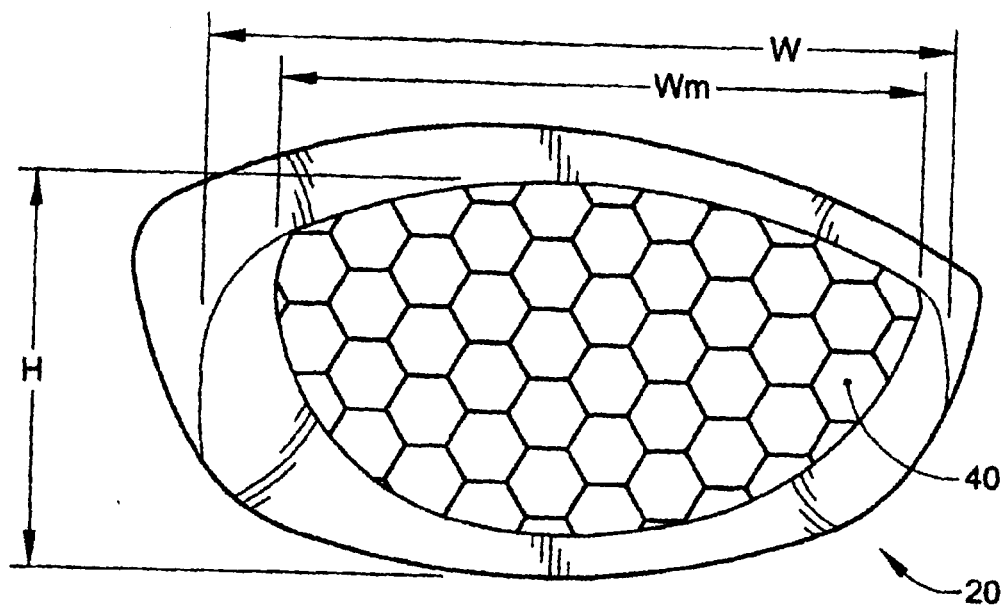
FIG. 2 is a front view of a wood-type golf club head illustrating height and width measurements.
Figure 13:
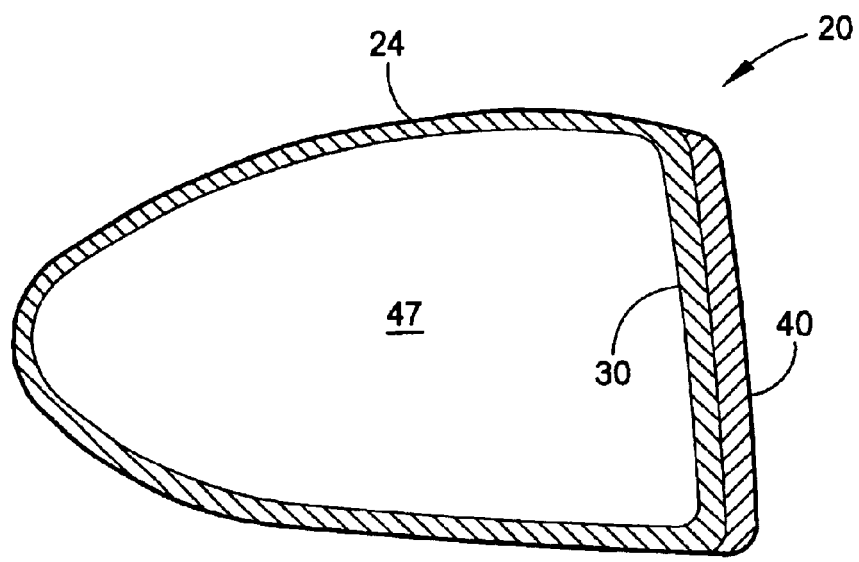
FIG. 13 is cross-sectional view of an alternative embodiment of a wood-type golf club head with a matrix layer.
Figure 14:
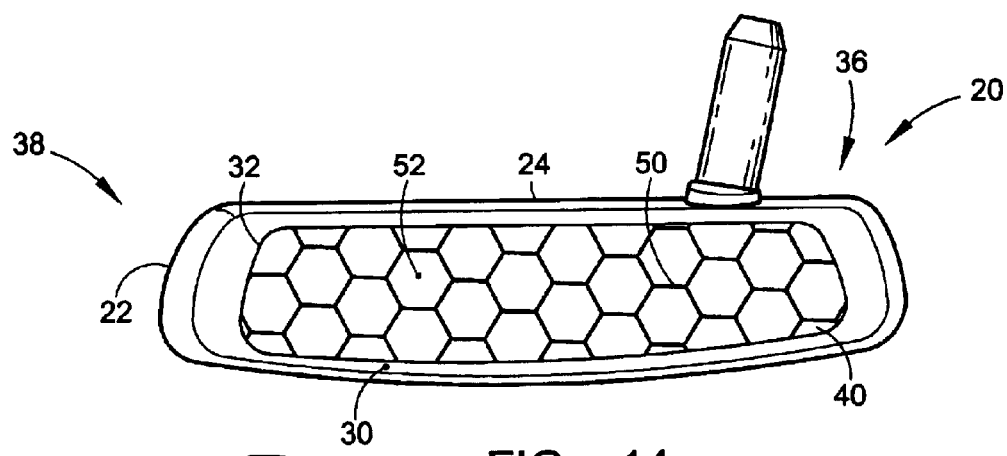
FIG. 14 is a front view of a putter-type golf club head with a matrix layer.
Figure 15:
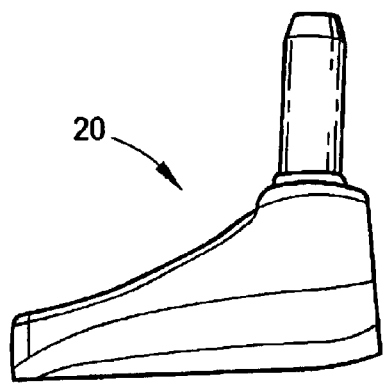
FIG. 15 is a toe-side view of the putter-type golf club head of FIG. 14.
Figure 16:
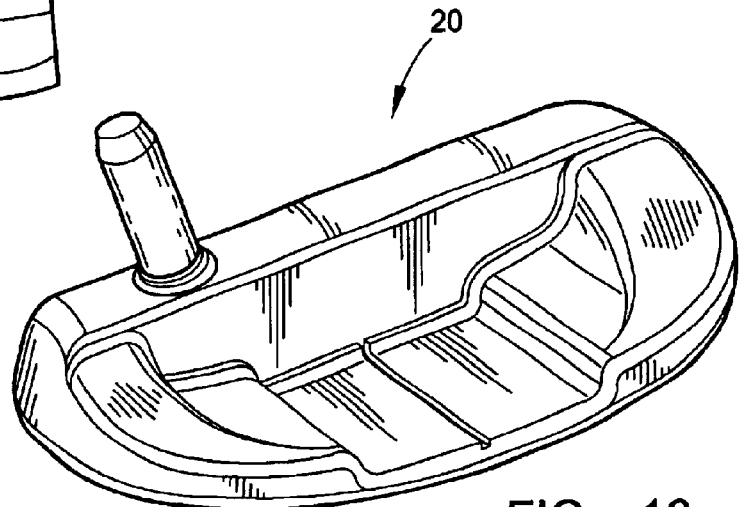
FIG. 16 is a rear perspective view of the putter-type golf club head of FIG. 14.
Figure 17:
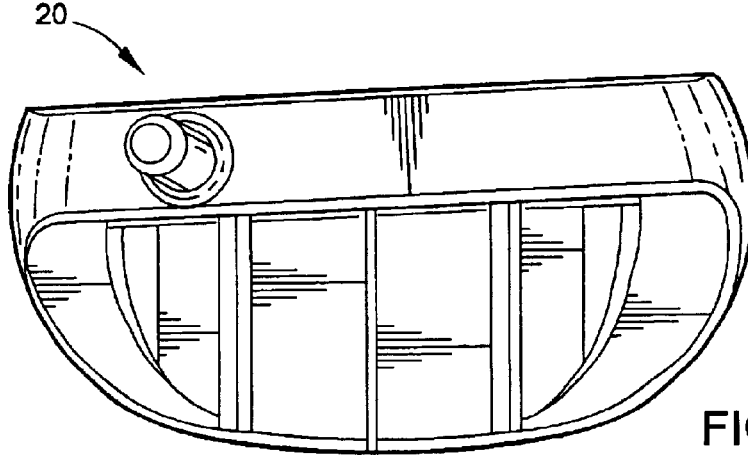
FIG. 17 is a top plan view of the putter-type golf club head of FIG. 14.
Figure 18:
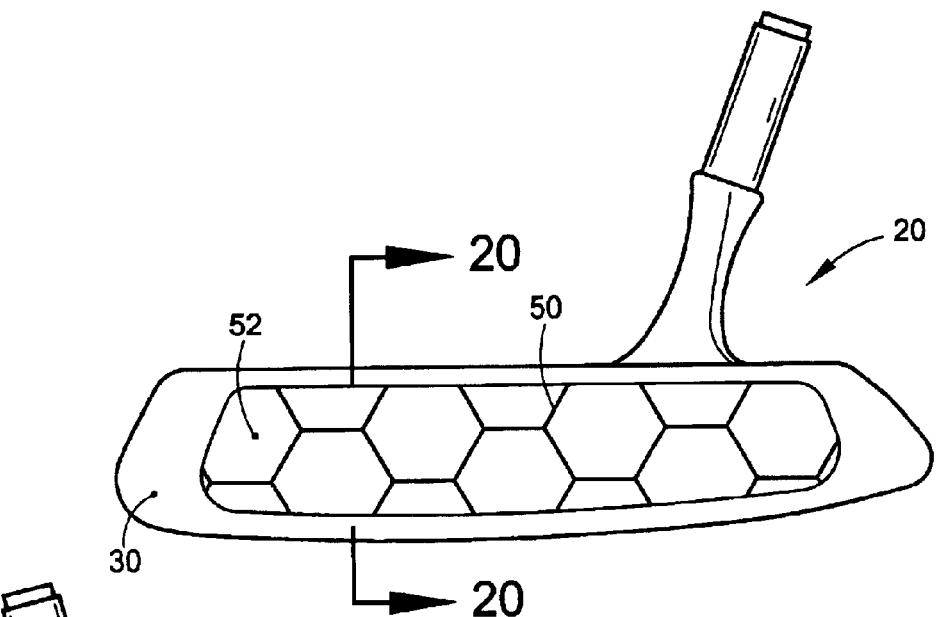
FIG. 18 is a front view of an alternative putter-type golf club head with a matrix layer.
Figure 19:
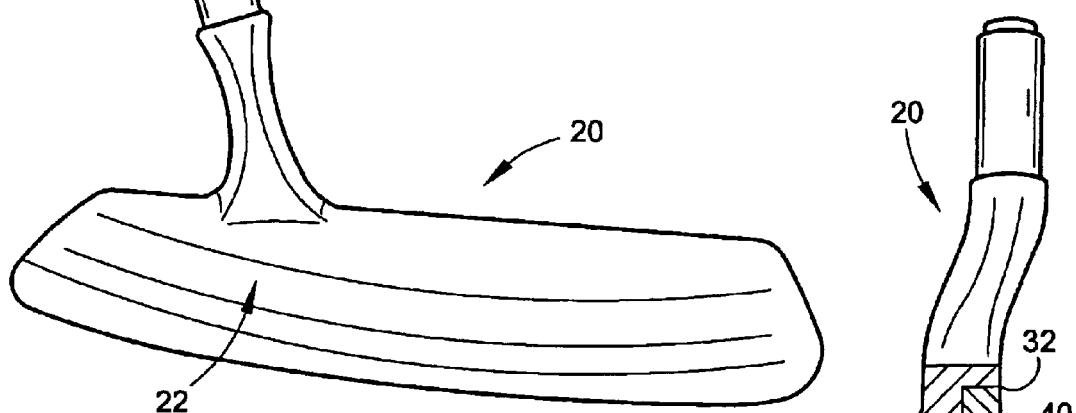
FIG. 19 is a rear perspective view of the putter-type golf club head of FIG. 18.
Figure 20:
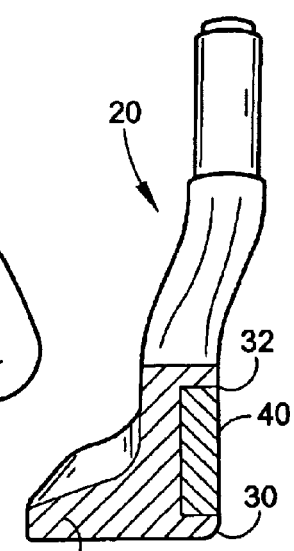
FIG. 20 is a cross-sectional view of the putter-type golf club head of FIG. 18 along line 20—20.
Figure 21:
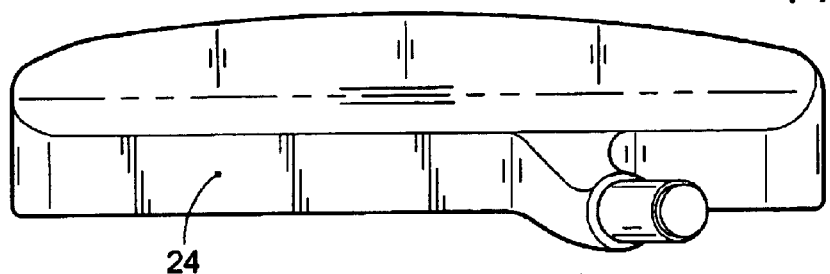
FIG. 21 is a top plan view of the putter-type golf club head of FIG. 18.
Figure 22:
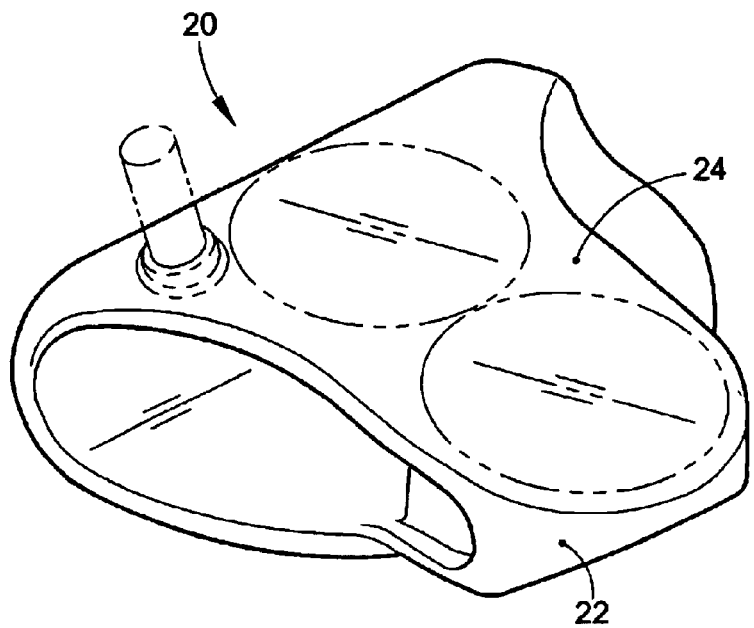
FIG. 22 is a top perspective view of an alternative putter-type golf club head with a matrix layer.
Figure 23:
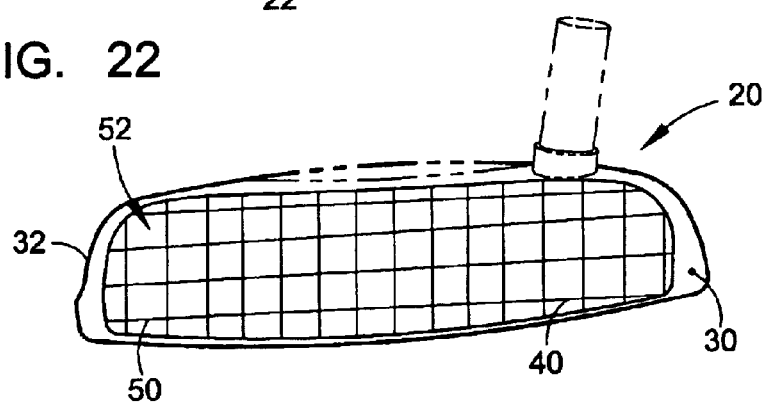
FIG. 23 is a front plan view of the putter-type golf club head of FIG. 22.
Figure 24:
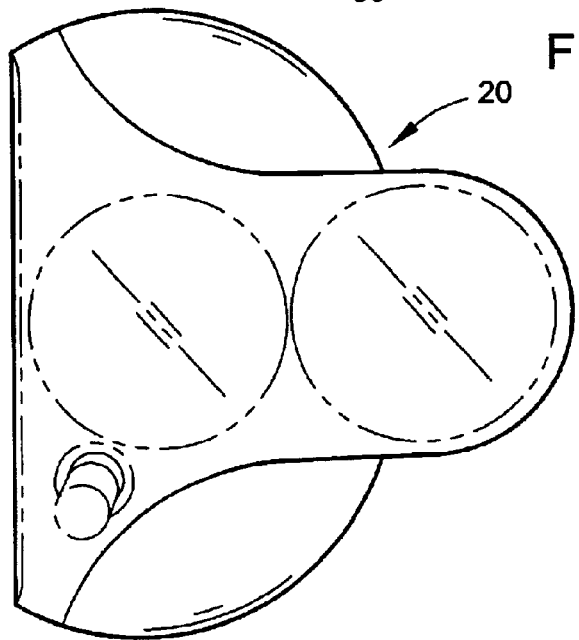
FIG. 24 is a top plan view of the putter-type golf club head of FIG. 22.
Figure 25:
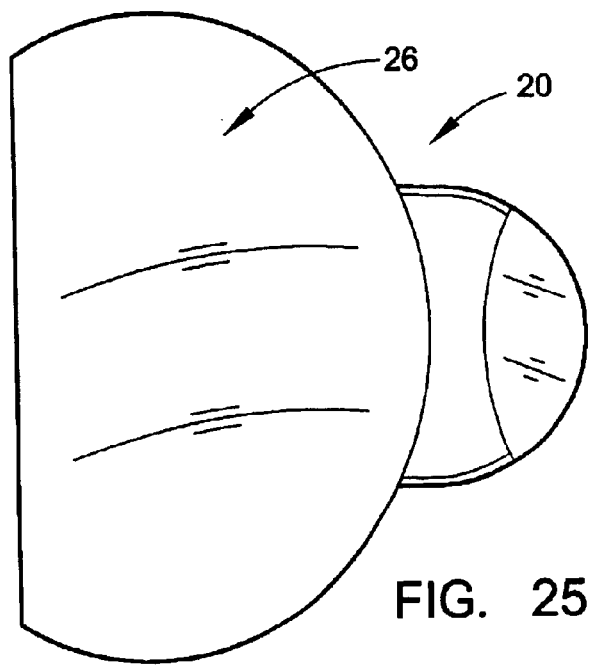
FIG. 25 is a bottom plan view of the putter-type golf club head of FIG. 22.

The golf club head 20 has a matrix layer 40 that is disposed on the front wall 30 of the body 22. In a preferred embodiment, the matrix layer 40 is an insert that is disposed in the recess 32 of the front wall 30. In an alternative embodiment shown in FIG. 13, the matrix layer 40 is disposed on the exterior surface of the front wall 30. A more detailed description of go 11 club head 20 with a layer disposed on the front wall is disclosed in co-pending U.S. Pat. No. 6,607,451, Ser. No. 10/063,680, filed on May 7, 2002 for A Compliant Polymer Face Golf Club Head, which is hereby incorporated by reference in its entirety. The matrix layer 40 is preferably composed of a reinforcement structure 50 and a polymer material 52. As shown in FIG. 2, the matrix layer 50 has a width Wm that preferably ranges from 2.0 inches to 4.0 inches. In a preferred embodiment, the matrix layer 40 has an uniform thickness that ranges from 0.040 inch to 0.250 inch, more preferably a thickness of 0.080 inch to 0.120 inch, and is most preferably 0.100 inch.

The polymer material 52 for the matrix layer 50 is preferably a thermoplastic polyurethane material. Polymer materials that may be utilized in the matrix layer 50 include: polymers from Bayer Corporation sold under the TEXIN brand such as TEXIN 4215, TEXIN 4210, TEXIN 270, TEXIN 4210 T2, TEXIN 270 T2, TEXIN 4215 T2 and TEXIN 4215 T3, which are thermoplastic polyurethanes and thermoplastic polyurethane and polycarbonate blends; polymers from BASF corporation such as TERLURAN EGP-7, TERLURAN HI-10, TERLURAN GP-22, which are ABS polymers, ULTRAMID A3HG5, LURANS 778 T1 and LURAN S 778 T/TE T2, which are ABS and polyamide blends, and TRIAX 1120, which is an ABS and polyamide blend; polymers from Du Pont Chemicals such as HYTREL 7246 thermoplastic polyester elastomer and HYLENE 58D polymer and SURLYN ionomers; polymers from GE Polymers such as NORYL PPX/PPX7115 polyphenylene ether and polystryene blend, LEXAN EXL 1330 T2, LEXAN EXL 1330 T3, LEXAN ML 6143/C1000, LEXAN 1330/ML6143, LEXAN ML6143H and LEXAN 1330, which are amorphous thermoplastic polymers, CYCOLOY C1000HF T1, CYCOLOY C1000HF T2, CYCOLOY C1000HF T3, CYCOLOY C1000HF T4 AND CYCOLOY C1000HF T5, which are ABS and polycarbonate blends; polymers from Atofina corporation sold under the brands ATOFINA 3429, ATOFINA 3467 and ATOFINA 7823 MZ; polymers from BP Chemical sold under the brand BAREX 210, which is an E acrylonitrile-methyl acrylate copolymer; polymers from Chevron corporation sold under the brands BK-12, KR03 and BK10/NAS90 blend; polymers from Exxon Mobil chemical sold under the brands PP1024E4, PP1043N, PP7033N, PP7032E2T1, PP7032KN and PP7032E2T2; polymers from Huntsman Chemical sold under the brand IROGRAN 113557; polymers from RTP corporation sold under the brands 1299-A 80D w/glass, 1299-B 80D without glass, RTP 4085 and Nylon 6 with nano; and polymers from Uniroyal sold under the brand AN2501750 blend T1, AN2501750 blend T2 and LF750D.

The polymer material 52 is preferably injection molded or compression molded around the reinforcement structure 50. However, those skilled in the pertinent art will recognize that other integration methods may be utilized in combining the reinforcement structure 50 and the polymer material 52 without departing from the scope and spirit of the present invention. The matrix layer 40 is applied to the front wall 30 of the golf club head 20. One application method is to use an adhesive to adhere an interior surface of the matrix layer 40 to the exterior surface of the front wall 30 within the recess 32. Another method is to use compressive forces to apply the matrix layer 40 within the recess 32. Yet another method is to use bolts to secure the matrix layer 40 within the recess 32. Yet a further method is to form the matrix layer 40 within the recess 32. However, those skilled in the pertinent art will recognize other methods to place the matrix layer 40 on the front wall 30 of the golf club head 20 without departing from the scope and spirit of the present invention.

Figure 5:
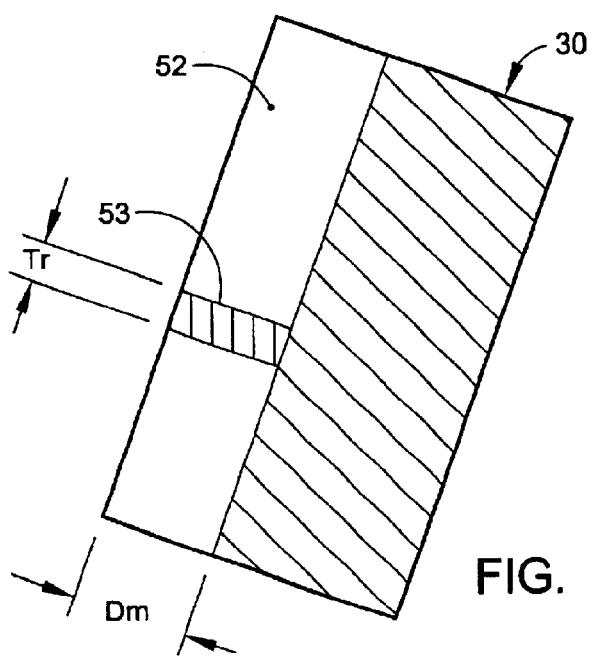
FIG. 5 is an enlarged isolated view of a matrix layer and a front wall.

The reinforcement structure 50 is preferably composed of aluminum, aramid fiber, fiberglass, carbon or a rigid polyurethane material, and such reinforcement structures are available from Hexcel Corporation of Pleasanton, Calif. under the brand HEXCEL COMPOSITES. The reinforcement structure 50 is preferably a plurality of interconnected cells 51, with each cell 51 preferably having a cell size ranging from 0.010 inch to 0.375 inch, more preferably from 0.0625 inch to 0.125 inch. Each cell 51 is preferably formed of integrated walls 52. As shown in FIG. 5, the reinforcement structure 50 preferably has a depth that extends along the entire depth, "Dm", of the matrix layer 40. In an alternative embodiment, the reinforcement structure 50 has a depth that partially extends along the depth of the matrix layer 40, ranging from 25% to 75% of the depth of the matrix layer 40. As shown in FIG. 5, each of the walls 53 of the reinforcement structure 50 preferably has a thickness, "Tr", ranging from 0.0005 inch to 0.01 inch, more preferably from 0.001 inch to 0.005 inch, and most preferably 0.002 inch.

Figure 4A:
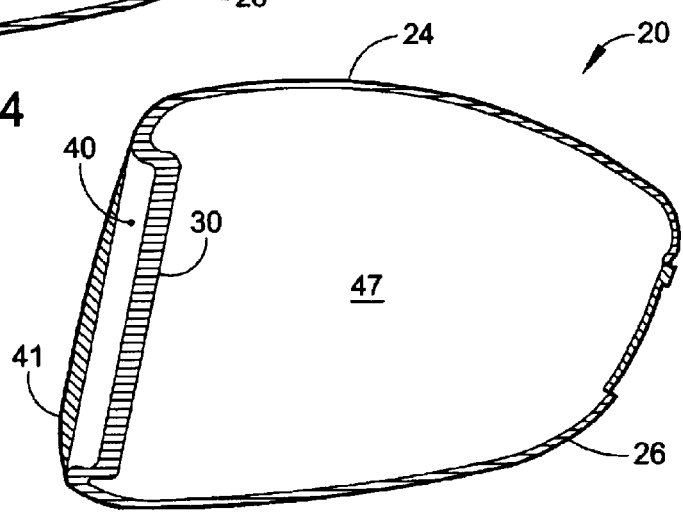
FIG. 4A is a cross-sectional view of an alternative embodiment of a wood-type golf club head.

In an alternative embodiment shown in FIGS. 4A and 5A, an outer layer 41 covers the matrix layer 40. The outer layer 41 provides additional protection to the matrix layer 40 during impact with a golf ball. The outer layer may be composed of any of the previously disclosed polymer materials. Further, the outer layer 41 preferably has a thickness ranging from 0.005 inch to 0.100 inch. In a most preferred embodiment, the outer layer 41 is composed of the same material as the polymer material 52 of the matrix layer 40.

Figure 1:
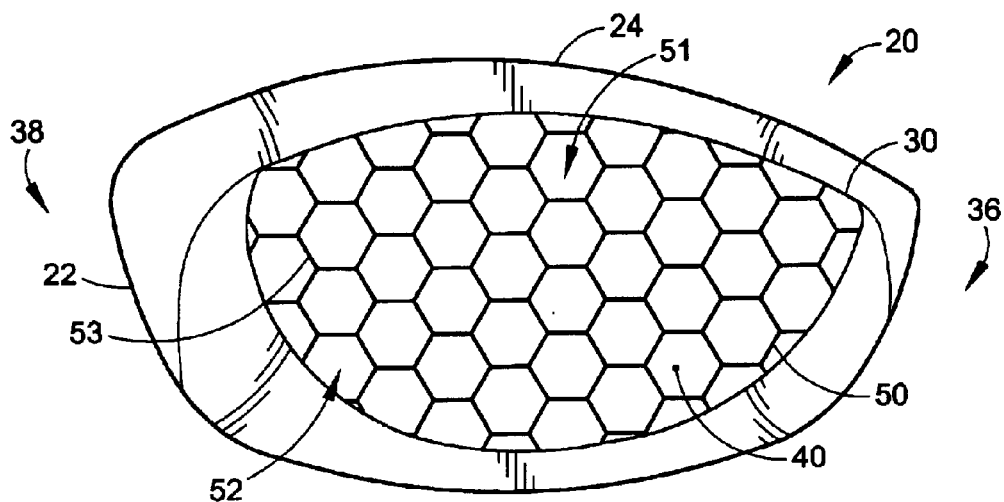
FIG. 1 is a front view of a wood-type golf club head with a matrix layer.
Figure 1A:
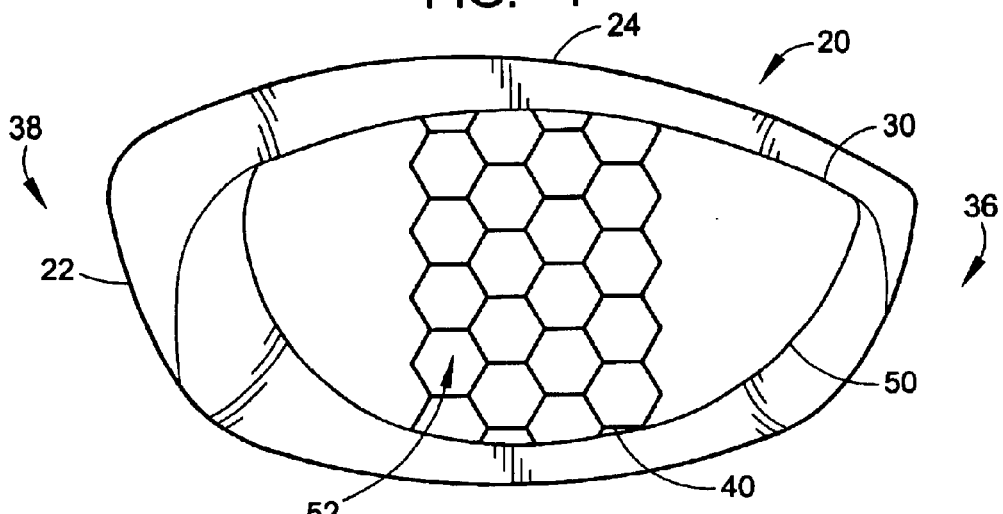
FIG. 1A is a front view of a wood-type golf club head with an alternative matrix layer.
Figure 1B:
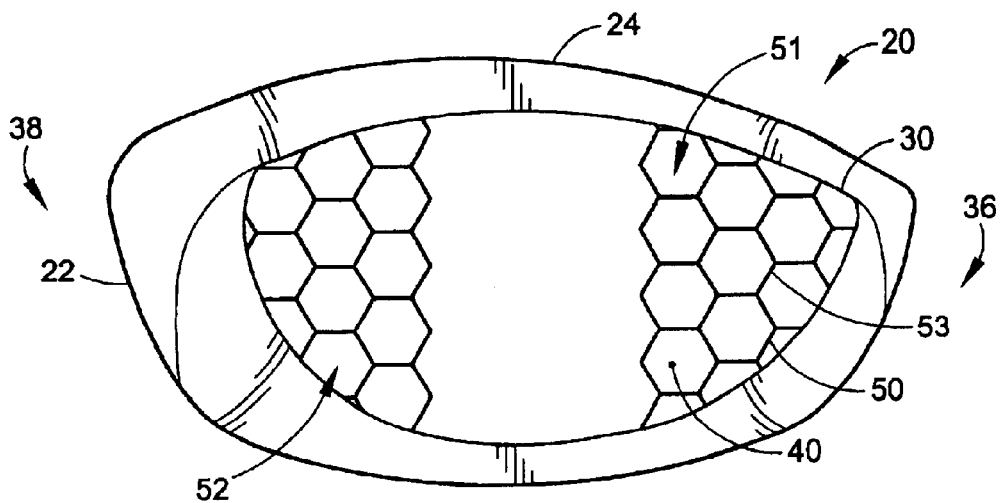
FIG. 1B is a front view of a wood-type golf club head with an alternative matrix layer.

As shown in FIGS. 1A and 1B, alternative embodiments of the matrix layer 40 have a reinforcement structure 50 that is only present in a portion of the matrix layer 40. In FIG. 1A, the reinforcement structure is only disposed in the center of the face of the golf club head 20 in accordance with high impact probability locations. In FIG. 1B, the reinforcement structure is absent from the center of the face 45 of the golf club head 20.

Figure 11:
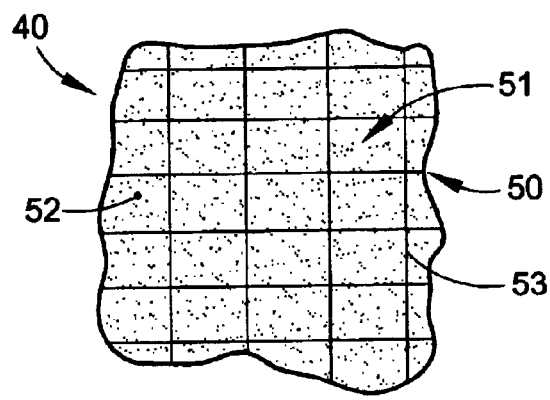
FIG. 11 illustrates an alternative embodiment of a matrix layer.
Figure 12:
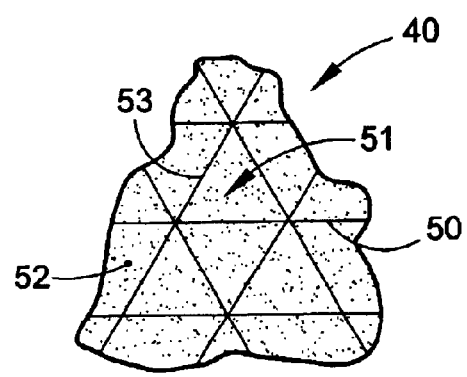
FIG. 12 illustrates an alternative embodiment of a matrix layer.

FIGS. 11 and 12 illustrate various grid formations of the reinforcement structure 50. FIG. 11 has a rectangular grid formation and FIG. 12 has a triangular grid formation. A preferred embodiment has a hexagonal grid formation, as shown in FIG. 1. Those skilled in the pertinent art will recognize that other grid formations may be used for the reinforcement structure 50 of the matrix layer 40 without departing from the scope and spirit of the present invention.

As shown in FIG. 6, a lofted driver with a polymer layer 52a on the front wall 30a will experience a shear stress, $\tau_o$, from the normal stress, $\sigma_o$, due to impact with a golf ball. The shear stress causes shear deformation of the polymer layer 52a thereby affecting the normal compliance of the polymer layer 52a, which reduces the increased COR due to the polymer layer 52a. The reinforcement structure 50 of the matrix layer 40 of the present invention reduces or eliminates the shear deformation of the polymer material 52 thereby allowing for increased COR and durability.

The wood-type golf club head 20 preferably has a high coefficient of restitution thereby enabling for greater distance of a golf ball hit with the golf club head of the present invention. The coefficient of restitution (also referred to herein as "COR") is determined by the following equation:

$$e = \frac{v_2 - v_1}{U_1 - U_2}$$

wherein $U_1$ is the club head velocity prior to impact; $U_2$ is the golf ball velocity prior to impact which is zero; $v_1$ is the club head velocity just after separation of the golf ball from the face of the club head; $v_2$ is the golf ball velocity just after separation of the golf ball from the face of the club head; and e is the coefficient of restitution between the golf ball and the club face.

The values of e are limited between zero and 1.0 for systems with no energy addition. The coefficient of restitution, e, for a material such as a soft clay or putty would be near zero, while for a perfectly elastic material, where no energy is lost as a result of deformation, the value of e would be 1.0. The present invention provides a wood-type golf club head 20 preferably having a coefficient of restitution preferably ranging from 0.80 to 0.87, and more preferably from 0.82 to 0.86, as measured under standard USGA test conditions.

Figure 3:
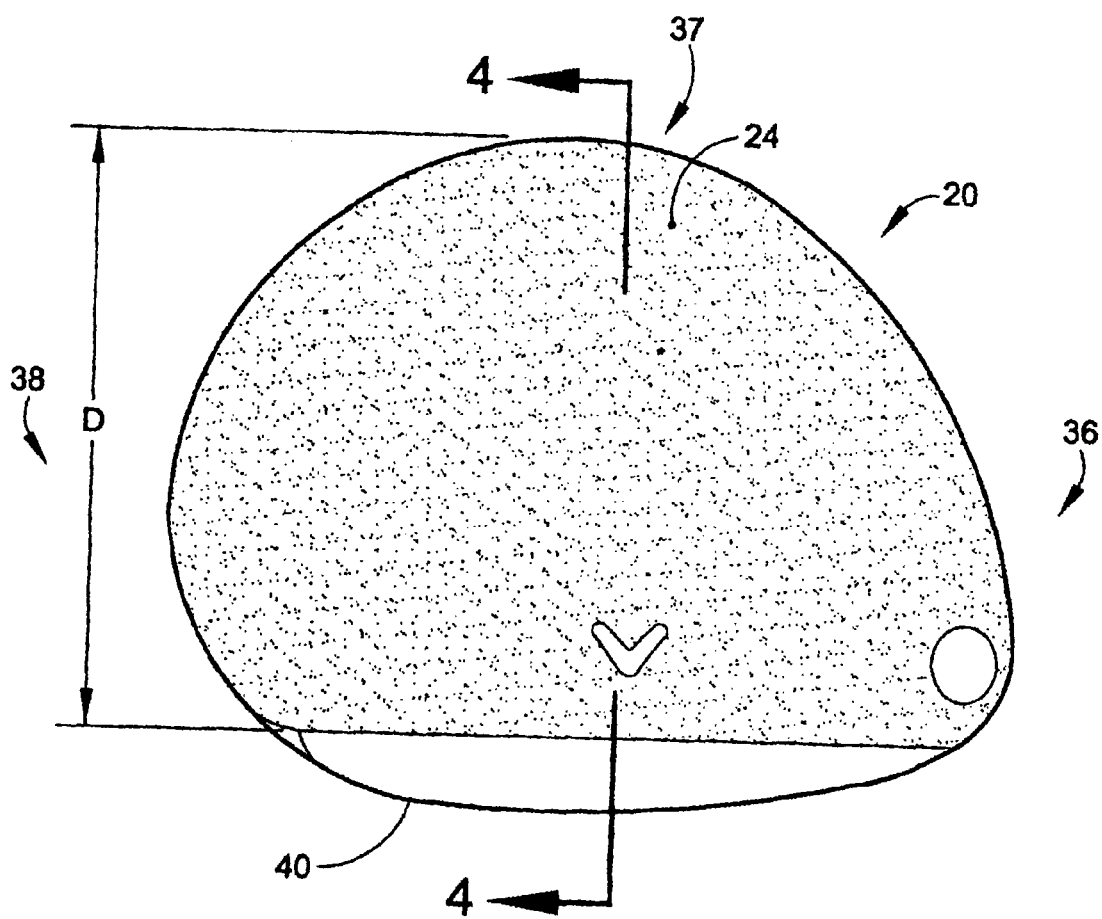
FIG. 3 is a top view of the wood-type golf club head of FIG. 1.

As shown in FIG. 3, the depth, "D", of the club head 20 from the front wall 30 to the aft-end 37 preferably ranges from 3.0 inches to 4.5 inches, and is most preferably 3.75 inches. As shown in FIG. 2, the height, "H", of the club head 20, as measured while in address position, preferably ranges from 2.0 inches to 3.5 inches, and is most preferably 2.50 inches or 2.9 inches. The width, "W", of the club head 20 from the toe end 38 to the heel end 36 preferably ranges from 4.0 inches to 5.0 inches, and more preferably 4.7 inches.

The face 45 of the golf club head 20 preferably has a large aspect ratio. The aspect ratio as used herein is defined as the height, "H", of the face 45 divided by the width, "W", of the face 45. The width, W, is measured between the farthest limits of the face 45 from the heel end 36 to the toe end 38. The measured width, W, does not include any portion of the body 22 that may be on the front of the club head 20 but not part of the face 45. The face 45 includes the front wall 30 and matrix layer 40. The height, H, is measured from between the farthest limits of the face 45 from the crown 24 to the sole 26. As with the width, W, the height, H, does not include any portion of the body 22 that may be on the front of the club head 20 but not part of the face 45.

In one embodiment, the width W is 3.35 inches and the height H is 2.0 inches giving an aspect ratio of 0.6. The face 45 of the golf club head 20 preferably has an aspect ratio that is greater than 0.575. The aspect ratio of the face 45 preferably ranges from 0.575 to 0.8, and is most preferably from 0.6 to 0.7. A discussion of the aspect ratio of the face of a golf club head is disclosed in Kosmatka, U.S. Pat. No. 6,338,683 for Striking Plate For A Golf Club Head, which is hereby incorporated by reference in its entirety.

The center of gravity and the moments of inertia of the golf club head 20 may be calculated as disclosed in co-pending U.S. Pat. No. 6,607,452, Ser. No. 09/796,951, filed an Feb. 27, 2001, entitled High Moment Of Inertia Composite Golf Club, and hereby incorporated by reference in its entirety. In general, the moment of inertia, Izz, about the Z axis for the golf club head 20 will preferably range from 2700 g-cm$^2$ to 4000 g-cm$^2$, more preferably from 3000 g-cm$^2$ to 3800 g-cm$^2$. The moment of inertia, Iyy, about the Y axis for the golf club head 20 will preferably range from 1500 g-cm$^2$ to 3500 g-cm$^2$.

Further, the golf club head 20 preferably has superior products of inertia wherein at least one of the products inertia, Ixy, Ixz and Iyz, of the golf club head 20 has an absolute value less than 100 g-cm$^2$, and more preferably two or three products of inertia, Ixy, Ixz and Iyz, of the golf club head 20 have an absolute value less than 100 g-cm$^2$. A discussion of the products of inertia is disclosed in Cackett, et al., U.S. Pat. No. 6,425,832 for Large Volume Driver Head With High Moments Of Inertia, which is hereby incorporated by reference in its entirety.

As shown FIGS. 14–25, another embodiment of the present invention is a putter-type golf club head 20 with a matrix layer 40 disposed in a recess 32 in a front wall 30 of the body 22 of the putter-type golf club head 20.

The putter-type golf club head 20 has a body 22 with a front wall 30 with a recess 32 therein. The matrix layer 40 extends along most of the front wall 30 from a heel end 36 of the putter-type golf club head 20 to a toe end 38 of the putter-type golf club head 20, and from a sole 26 to a crown 24.

The body 22 of the putter-type golf club head 20 is preferably composed of a metallic material such as stainless steel. Other metallic materials include titanium, aluminum, tungsten, zinc, magnesium, and alloys of stainless steel and tungsten. However, those skilled in the pertinent art will recognize that the body 22 may be composed of other materials without departing from the scope and spirit of the present invention. Further, the non-matrix layer portion of the front wall 30 may be smooth or textured to provide a consistent or non-consistent surface. Additionally, the body 22 may be specifically weighted to provide a specific center of gravity and inertial properties for the putter-type golf club head 20. In a preferred embodiment, each of the putter-type club heads 20 weighs approximately 328 grams±7 grams. Further, in a preferred embodiment, the recess 32 of each of the putter-type club heads 20 has a depth of approximately 0.205 inches±0.010 inch.

FIGS. 14–17 illustrate a semi-mallet putter-type golf club head 20 and FIGS. 18–21 illustrate a flanged blade putter. A more thorough description of the putter-type golf club heads 20 of FIGS. 14–21 is set forth in U.S. Pat. No. 6,238,302, issued on May 29, 2001, which relevant parts are hereby incorporated by reference. FIGS. 22–25 illustrate an extended mallet type putter-type golf club head 20 with an alignment system such as disclosed in U.S. Pat. No. 6,471,600, issued on Oct. 22, 2002, which relevant parts are hereby incorporated by reference. However, those skilled in the art will recognize that other similar putter designs may be utilized without departing from the scope and spirit of the present invention.

Figure 26:
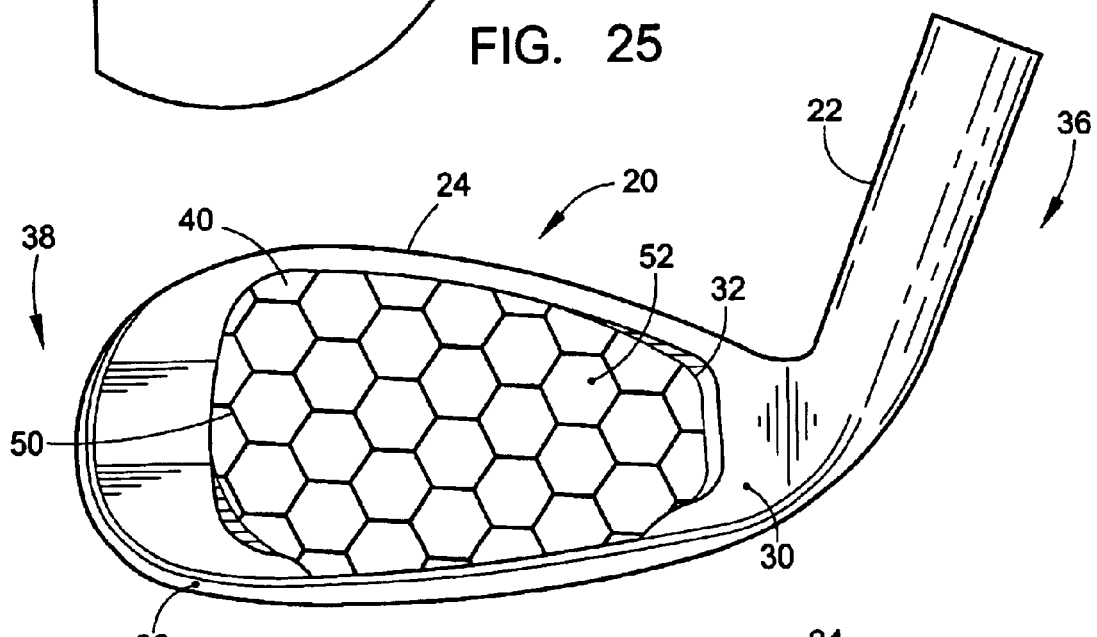
FIG. 26 is a front plan view of an iron-type golf club head with a matrix layer.
Figure 27:
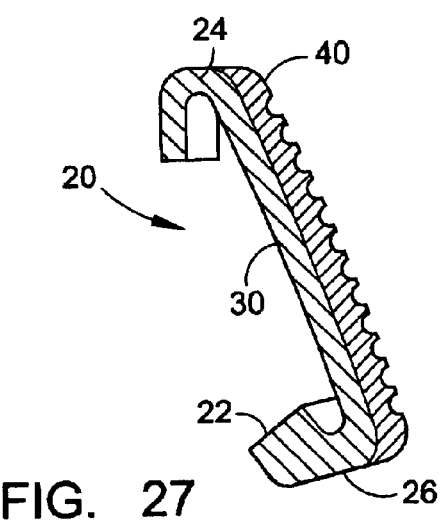
FIG. 27 is a cross-section view of an alternative iron-type golf club head with a matrix layer.

As shown FIGS. 26–27, another embodiment of the present invention is an iron-type golf club head 20 with a matrix layer 40 disposed in a recess 32 in a front wall 30 of the body 22 of the iron-type golf club head 20, or as shown in FIG. 27, the matrix layer 40 is adhered to the front wall 30 of the body 22 of the iron-type golf club head 20. Such an iron-type golf club head 20 is described in U.S. Pat. No. 5,704,849, issued on Jan. 6, 1998, and which relevant parts are hereby incorporated by reference.

As shown in FIG. 26, the iron-type golf club head (wedge) 20 has a body 22 with a front wall 30 with a recess 32 therein. The matrix layer 40 is disposed within the recess 32 and preferably extends along most of the front wall 30 from a heel end 36 of the iron-type golf club head 20 to a toe end 38 of the iron-type golf club head 20, and from a sole 26 to a crown (top wall) 24.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A golf club head comprising:
a body comprising a crown, a sole and a front wall, the front wall having an exterior surface, the body having a hollow interior, the body having a volume ranging from 300 cubic centimeters to 500 cubic centimeters, the body composed of a material selected from the group consisting of titanium, titanium alloy and steel; and
a matrix layer having an interior surface, the interior surface of the matrix layer disposed on the exterior surface of the front wall of the body, the matrix layer comprising a polymer material and an integrated reinforcement structure, the matrix layer having a thickness ranging from 0.010 inch to 0.250 inch, the integrated reinforcement structure composed of a material selected from the group consisting of aluminum, aramid fiber, fiberglass, carbon and polyurethane.

2. The golf club head according to claim 1 wherein the integrated reinforcement structure is a plurality of interconnected cells, each cell having a cell size ranging from 0.010 inch to 0.250 inch.

3. The golf club head according to claim 1 wherein the body is composed of a titanium alloy material and the front wall has a thickness ranging from 0.030 inch to 0.150 inch.

4. The golf club head according to claim 1 wherein the polymer material of the matrix layer is composed of a material selected from the group consisting of thermoplastic polyurethane, polyether block copolymer, ionomer, nylon, polyamide and polypropylene.

5. The golf club head according to claim 1 wherein the matrix layer has a thickness ranging from 0.080 inch to 0.120 inch.

6. The golf club head according to claim 1 wherein a face of the golf club head has an aspect ratio greater than 0.575.

7. The golf club head according to claim 1 wherein the front wall has a plurality of concentric regions of thickness.

8. The golf club head according to claim 1 wherein the golf club head has a coefficient of restitution ranging from 0.82 to 0.93.

9. A golf club head comprising:
a body comprising a crown, a sole and a front wall, the front wall having an exterior surface, the body having a hollow interior, the body having a volume ranging from 300 cubic centimeters to 500 cubic centimeters, the body composed of a titanium alloy material, the front wall having a recess, the recess having a depth ranging from 0.040 inch to 0.250 inch; and
a matrix layer having an interior surface, the matrix layer disposed within the recess of the front wall with the interior surface of the matrix layer disposed on the exterior surface of the front wall, the matrix layer comprising a polymer material and an integrated reinforcement structure composed of interconnected hexagonal cells, each hexagonal cell having a cell size of 0.0625 inch to 0.100 inch, the matrix layer having a thickness ranging from 0.040 inch to 0.250 inch, the integrated reinforcement structure composed of a material selected from the group consisting of aluminum, aramid fiber, fiberglass, carbon and polyurethane.

10. The golf club head according to claim 9 wherein the polymer material of the matrix layer is composed of a thermoplastic polyurethane material.

11. The golf club head according to claim 9 wherein the golf club head has a moment of inertia, Izz, about the Z axis through the center of gravity of the golf club head that ranges from 2700 g-cm$^2$ to 4000 g-cm$^2$.

12. A Wood-type golf club head comprising:
a body comprising a crown, a sole and front wall, the front wall having an exterior surface, the body having a hollow interior, the body having a volume ranging from 300 cubic centimeters to 500 cubic centimeters, the body composed of a titanium alloy material, the front wall having a recess, the recess having a depth ranging from 0.040 inch to 0.250 inch; and
a matrix layer having an interior surface, the matrix layer disposed within the recess of the front wall with the interior surface of the matrix layer disposed on the exterior surface of the front wall, the matrix layer comprising a thermoplastic polyurethane material and an integrated reinforcement structure composed of interconnected hexagonal cells, each hexagonal cell having a cell size of 0.0625 inch to 0.100 inch, the matrix layer having a thickness ranging from 0.040 inch to 0.250 inch, the integrated reinforcement structure composed of an aluminum material;
wherein the golf club head has a coefficient of restitution ranging from 0.82 to 0.93.

13. A golf club head comprising:
a body comprising a crown, a sole and a front wall, the front wall having an exterior surface, the body having a hollow interior, the body having a volume ranging from 300 cubic centimeters to 500 cubic centimeter, the body composed of a titanium alloy material, the front wall having a recess, the recess having a depth ranging from 0.040 inch to 0.250 inch; and
a matrix layer disposed within the recess of the front wall with the interior surface of the matrix layer disposed on the exterior surface of the front wall, the matrix layer comprising a polymer material and an integrated reinforcement structure composed of interconnected hexagonal cells, each hexagonal cell having a cell size of 0.0625 inch to 0.100 inch, the matrix layer having a thickness ranging from 0.040 inch to 0.250 inch, the integrated reinforcement structure composed of an aluminum material;
wherein the golf club head has a moment of inertia, Izz, about the Z axis of the center of gravity of the golf club head ranging front 2700 g-cm$^2$ to 4000 g-cm$^2$.

* * * * *